United States Patent
Dagley et al.

(10) Patent No.: US 12,211,089 B2
(45) Date of Patent: *Jan. 28, 2025

(54) AUGMENTED REALITY VEHICLE SEARCH ASSISTANCE

(71) Applicant: Capital One Services, LLC, McLean, VA (US)

(72) Inventors: Geoffrey Dagley, McKinney, TX (US); Qiaochu Tang, Frisco, TX (US); Micah Price, The Colony, TX (US); Avid Ghamsari, Carrollton, TX (US); Jason Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,516

(22) Filed: Aug. 8, 2023

(65) Prior Publication Data

US 2023/0385912 A1 Nov. 30, 2023

Related U.S. Application Data

(63) Continuation of application No. 17/539,713, filed on Dec. 1, 2021, now Pat. No. 11,763,375, which is a (Continued)

(51) Int. Cl.
*H04W 24/00* (2009.01)
*G01C 21/36* (2006.01)
*G06F 16/23* (2019.01)
*G06K 19/06* (2006.01)
*G06Q 10/087* (2023.01)
(Continued)

(52) U.S. Cl.
CPC ..... *G06Q 30/0639* (2013.01); *G01C 21/3632* (2013.01); *G06F 16/23* (2019.01); *G06K 19/06037* (2013.01); *G06Q 10/087* (2013.01); *G06Q 30/0623* (2013.01); *G06Q 30/0631* (2013.01); *H04W 4/023* (2013.01);
(Continued)

(58) Field of Classification Search
CPC ........... G06Q 30/0639; G06Q 30/0631; G06Q 10/087; G06Q 30/0623; H04W 12/63; H04W 4/026; H04W 12/06; H04W 4/024; H04W 4/023; G06F 16/23; G01C 21/3632; G06K 19/06037
USPC ............................. 455/456.1–456.3; 370/338
See application file for complete search history.

(56) References Cited

U.S. PATENT DOCUMENTS 11,064,102 B1 7/2021 Helpingstine et al.
2015/0170031 A1 6/2015 Attar et al.
(Continued)

*Primary Examiner* — Marcos Batista
(74) *Attorney, Agent, or Firm* — Banner & Witcoff, Ltd.

(57) ABSTRACT

Aspects described herein may allow for auto-locating a user in a parking lot and/or automatically directing a user to recommended inventory. For example, a customer may capture an image of a vehicle, or a marker associated with a vehicle, in a parking lot. The image may be processed locally or at a server. A vehicle may be identified based on analysis of the image. Further, information regarding the user may be processed to determine another vehicle appropriate for a recommendation. For example, a prompt on a mobile device may suggest a popular model similar to the vehicle being viewed. The system may then provide directions (e.g., augmented reality directions) to the user to direct the user to the vehicle.

20 Claims, 7 Drawing Sheets

Related U.S. Application Data continuation of application No. 16/868,066, filed on May 6, 2020, now Pat. No. 11,195,226.

(51) Int. Cl.
*G06Q 30/0601* (2023.01)
*H04W 4/02* (2018.01)
*H04W 4/024* (2018.01)
*H04W 12/06* (2021.01)
*H04W 12/63* (2021.01)

(52) U.S. Cl.
CPC .......... *H04W 4/024* (2018.02); *H04W 4/026* (2013.01); *H04W 12/06* (2013.01); *H04W 12/63* (2021.01)

(56) References Cited

U.S. PATENT DOCUMENTS

| | | | |
|---|---|---|---|
| 2015/0312400 A1* | 10/2015 | Hansen | G06K 9/00536 |
| | | | 455/414.1 |
| 2017/0109942 A1 | 4/2017 | Zivkovic et al. | |
| 2018/0025044 A1 | 1/2018 | Hostetter et al. | |

* cited by examiner

AUGMENTED REALITY VEHICLE SEARCH ASSISTANCE

CROSS-REFERENCE TO RELATED APPLICATIONS

The instant application is a continuation of and claims priority to co-pending U.S. patent application Ser. No. 17/539,713 titled "AUGMENTED REALITY VEHICLE SEARCH ASSISTANCE," filed Dec. 1, 2021, which is a continuation of and claims priority to U.S. patent application Ser. No. 16/868,066, titled "AUGMENTED REALITY VEHICLE SEARCH ASSISTANCE," filed May 6, 2020, and issued as U.S. Pat. No. 11,195,226 on Dec. 7, 2021, the disclosure of which is hereby incorporated by reference in its entirety.

FIELD OF USE

Aspects of the disclosure relate generally to electronic devices. More specifically, aspects of the disclosure may provide for systems and methods for auto-locating a user in a parking lot and/or automatically directing a user to recommended inventory.

BACKGROUND

Auto dealerships today may physically deploy people to parking lots and other locations to allow potential customers the ability to view and test drive vehicles. Additionally, vehicles on a dealer lot are often randomly distributed, and it may be difficult for a customer to find a physical vehicle corresponding to an online dealership listing. Thus, the physical location, accessibility, and availability of auto dealerships and their vehicles can be a problem for customers or potential buyers who may desire to view a vehicle. Systems and methods to better facilitate vehicle sales are needed.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects discussed herein may provide a computer-implemented method for auto-locating a user in a parking lot and/or automatically directing a user to recommended inventory. The method may utilize modern technology to provide a user with access to a vehicle without the need to consult an in-person salesman, while managing inventory and vehicle access. For example, in at least one implementation, a mobile device may send, to a server, authentication information associated with a user. The mobile device may use an image sensor to capture an image of a vehicle or a physical marker. The mobile device may also determine location information corresponding to a location of the mobile device. The location information may comprise a QR code or GPS data. The server (e.g., after receiving the image and the location information) may determine one or more possible vehicles that correspond to the image (e.g., based on correlating the location of the mobile device with a plurality of vehicles proximate to the location). The image may be processed (by the mobile device or by the server) to determine if the vehicle in the image satisfies a threshold similarity with the geometry of a vehicle of one or more possible vehicles. The server may send a request to the mobile device to confirm the identity of the vehicle, and may receive a confirmation of the vehicle from the mobile device. A location of the mobile device may be updated based on confirming a proximity to the vehicle.

The server may determine, based on one or more characteristics of the vehicle, a listing of one or more additional vehicles. The listing may be determined based on one or more characteristics of the vehicle. One or more preferred alternative characteristics may be determined based on demographic information associated with the user. The plurality of vehicles of the listing may be determined based on the plurality of vehicles being associated with the one or more preferred alternative characteristics. The server may send, to the mobile device, the listing, wherein the listing may comprise one or more relative locations for each of the one or more additional vehicles. The mobile device may display the listing, which may comprise one or more attributes of the vehicles notated in the listing, and may receive a selection of one or more attributes and/or one or more vehicles via the mobile device. A path to the relative locations of the one or more additional vehicles (and/or the selected vehicles or vehicles corresponding to the attributes) from the location of the mobile device may be determined (e.g., by the mobile device, or from the server, which may send the path to the mobile device). The one or more relative locations may be relative to the initial vehicle captured in the image. The server may cause display of one or more directional indicators corresponding to the one or more relative locations, which may be displayed on the mobile device. The one or more directional indicators may comprise one or more directions to the one or more additional vehicles, wherein the one or more directional indicators may comprise a display of an indicator relative to the relative orientation of the mobile device. The location of vehicles may be updated. For example, the server may receive additional location information corresponding to the plurality of vehicles, may update a database with the additional location information, and may determine one or more relative locations based on the location information. The additional location information may be determine based on examining one or more images associated with the plurality of vehicles, wherein the one or more images may indicate where the plurality of vehicles are parked.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to systems, methods, techniques, apparatuses, and non-transitory computer readable media for auto-locating a user in a parking lot and/or automatically directing a user to a recommended inventory. For example, a customer may capture an image of a vehicle, or a marker associated with a vehicle, in a parking lot. The image may be processed locally or at a server. Using context information (e.g., visual information of the vehicle, the marker, surrounding geometry, or location information associated with the user), the vehicle may be identified (e.g., make, model, and/or features). Further, information regarding the user may be processed to determine another vehicle appropriate for a recommendation. For example, a prompt on a mobile device may suggest a popular model similar to the vehicle being viewed. The system may then provide directions (e.g., augmented reality directions) to the user to direct the user to the vehicle. Further discussion regarding some aspects of the use of physical markers to identify a vehicle, and/or the use of augmented reality directions to find a vehicle, may be found in U.S. application Ser. No. 16/434,505, entitled "Automated System for Car Access in Retail Environment," the contents of which is incorporated herein in its entirety. As discussed further herein, this combination of features may allow a user to identify a vehicle for purchase on a crowded and ever-changing dealership lot.

Before discussing these concepts in greater detail, however, several examples of a computing device that may be used in implementing and/or otherwise providing various aspects of the disclosure will first be discussed with respect to FIG. 1.

Figure 1:
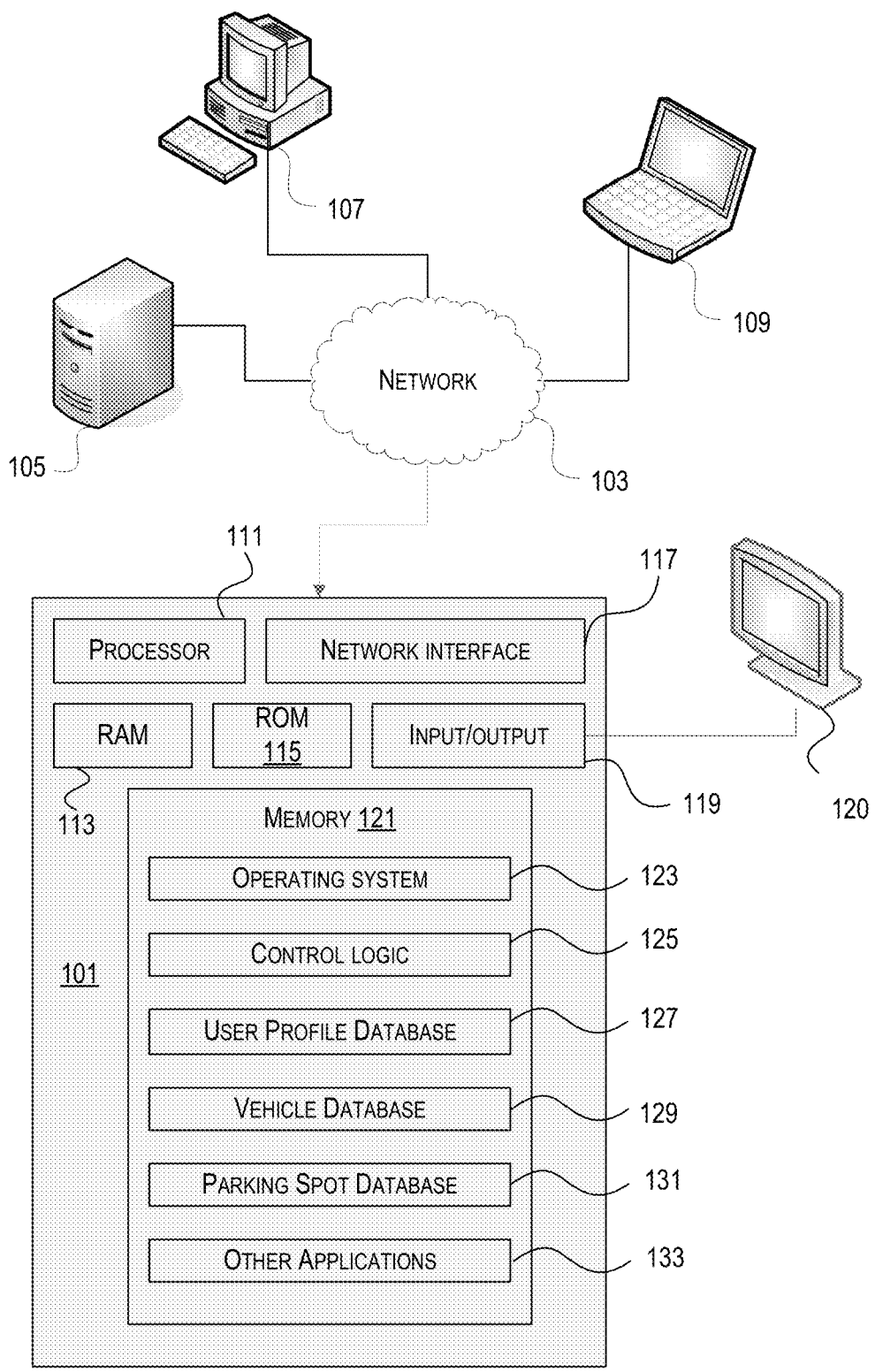
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associating smart key storage devices with vehicle keys, tracking the status of vehicle keys based on sensor data received from the smart key storage devices, generating vehicle access for a user (e.g., for a test drive), tracking vehicle locations, calculating directions to/from a vehicle, and other functions. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein. Furthermore, memory 121 may store various databases and applications depending on the particular use, for example, user profile database 127, vehicle database 129, parking spot database 131, and other applications 133 may be stored in a memory of a computing device used at a server system that will be described further below. Control logic 125 may be incorporated in and/or may comprise a linking engine that updates, receives, and/or associates various information stored in the memory 121 (e.g., user identifiers, vehicle and vehicle key identifiers, locking information, statuses, location information, directional information, etc.). In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to an illustrative environment and network for test driving vehicles with minimal human interaction.

Figure 2:
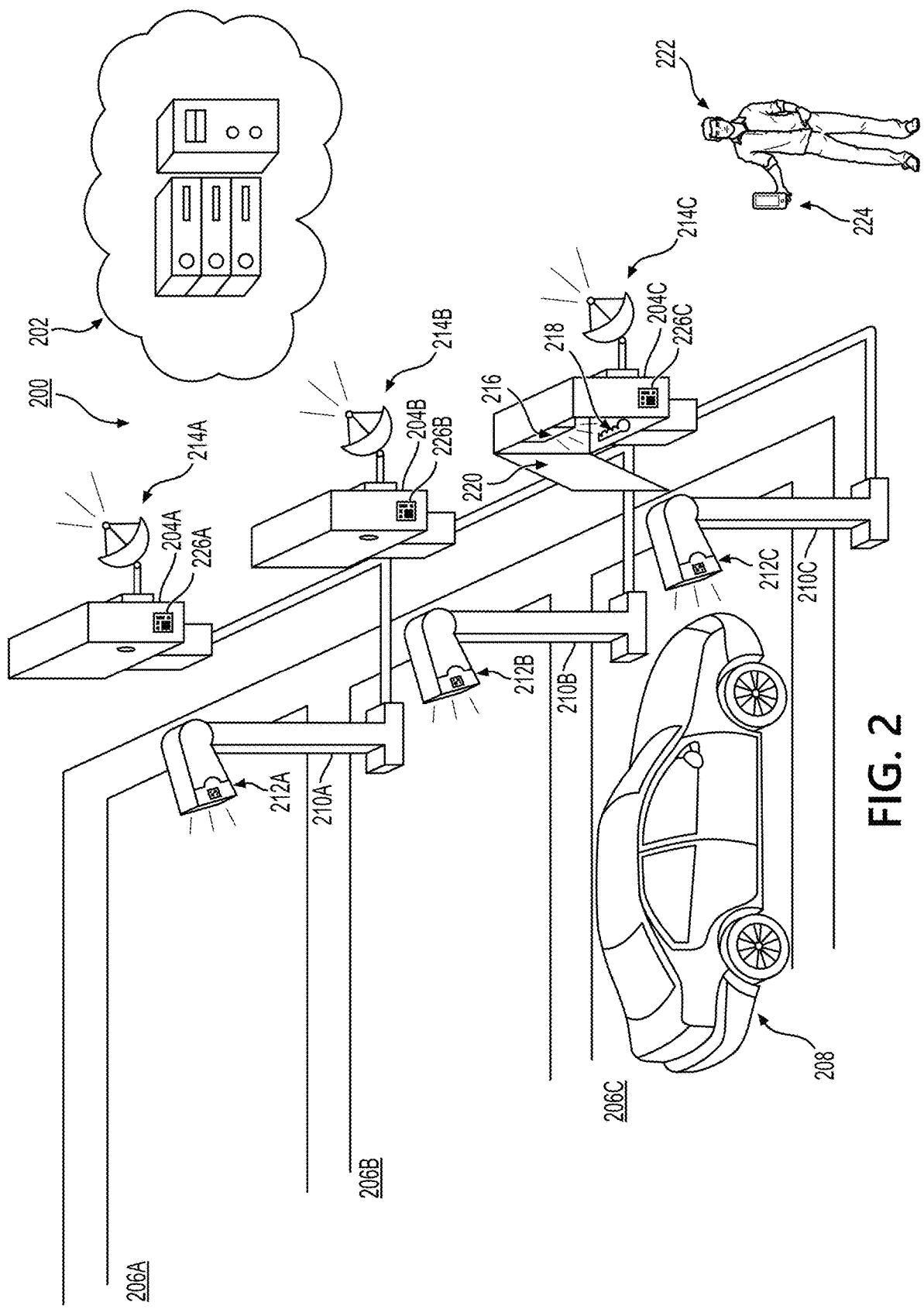
FIG. 2 depicts an example environment in accordance with one or more illustrative aspects discussed herein.

FIG. 2 depicts an example environment 200 in accordance with one or more illustrative aspects discussed herein. In at least one aspect, a user 222, via a mobile device 224, may be able to view a vehicle 208 with limited human interaction. For example, the user 222 may send a request to view and/or test drive a desired vehicle 208. In various embodiments, "test drive" may be further used to refer to the act of driving a vehicle in order to test the vehicle before a rental, lease, or purchase agreement. The request may be inputted into an application running on mobile device 224 and may be sent to a remote or local server 202. The user 222 may be given instructions that the desired vehicle is parked at a specific parking spot 206C. Also or alternatively, the user 222 may visually survey various vehicles parked in a plurality of parking spots 206A-206C (other vehicles not shown), and choose to view and/or test drive one of the vehicles (e.g., vehicle 208). The user 222 may be given instruction, e.g., via an application running on mobile device 224 and hosted and/or managed by a server 202, to access a vehicle key 218 for the desired vehicle 208 from a vehicle key storage device 204C. Smart key storage devices 204A-204C may be located adjacent to and/or in front of parking spots 206A-206C. The smart key storage device may comprise a compartment, container, storage facility, or similar apparatus ("storage compartment") having an entry that can be locked or unlocked. The entry be a door, lid, chute, and/or other panel ("storage door") that could be electronically locked or unlocked to deny or allow access to contents within the storage compartment. A key, key fob, remote, or electronic device for accessing a vehicle ("vehicle key") may be a content that can be stored in the storage compartment of the smart key storage device. While referred to as a "vehicle key" for simplicity, it is to be understood that the vehicle key need not be restricted to conventional mechanical keys but may also include electronic devices, remotes, key fobs, and other means for accessing a vehicle.

The instructions to access a vehicle key from a specified smart key storage device may be given by server 202. The server may also provide and/or equip the smart key storage devices 204A-204C with unlock instructions. For example, an unlock instruction may include an instruction to unlock a door, lid, chute, and/or other panel ("storage door") to the storage compartment 220 of the smart key storage device 204A-204C (e.g., in response to an unlock request signal sent by the mobile device 224). The unlock request signal may be a near field communication (NFC) signal sent by the mobile device 224 to a NFC receiver on the smart key storage device. The unlock instruction may include an instruction to unlock the storage door to the storage compartment 220 of the smart key storage device 204A-204C if the mobile phone registers and/or captures a physical marker 226A-226C (e.g., RFID tag) on the smart key storage device. After registering or capturing the physical marker 226A-226C, the mobile device 224 may relay a signal to the server 202, which may inform the smart key storage device 204A-204C to unlock. The server 202 may track the status of each smart key storage device 204A-204C via their respective wireless transceivers 214A-214C.

A user 222 desiring to view details of and/or test drive a vehicle 208 parked in parking spot 206C may register or capture the physical marker 226C of the adjacent smart key storage device 204C. An identifier (e.g., RFID) may be captured from the physical marker 226C by a sensor (e.g., scanner, camera, etc.) on the mobile device 224, and the sent to the server 202. The server may then allow the smart key storage device corresponding to the scanned physical marker (e.g., smart key storage device 204C) to unlock its storage door, allowing the user 222 to access the vehicle key 218 that is stored in the storage compartment. The vehicle key 218 may also have a physical marker that is detectable by a key sensor 216 in the storage compartment. In some aspects, the storage compartment may be designed to prevent random contents from being stored, other than vehicle keys.

The key sensor 216 may be located within the storage compartment of the smart key storage device. The key sensor 216 may detect that the vehicle key 218 has been removed or placed and may update the server 202 of the removal or placement. The key sensor 216 may also detect the presence of the key and update the server 202 accordingly. Information regarding a vehicle key's placement, removal, or presence in a smart key storage device may be used by the server to update the status of the smart key storage device or the vehicle key, or form an association between the smart key storage device and the vehicle key. Furthermore, the key sensor may be capable of detecting a physical marker on the vehicle key.

Thus, the key sensor 216 may comprise one or more sensors that can detect motion and/or proximity, or can capture an image (e.g., to detect a physical marker). For example, the key sensor 216 may be a proximity sensor that emits an electromagnetic field or beam, or an ultrasound field or beam, on to the storage compartment and detect changes in the field or return signal. The presence of a vehicle key 218 may cause the sensor to detect a significant change in the field or return signal. In another example, the key sensor 216 may comprise a motion sensor that uses changes in image capturing to detect a removal or placement of a vehicle key. Furthermore, the key sensor 216 may capture an image of the vehicle key and detect a physical marker from the captured image.

As described above, in some implementations, a physical marker may be located on the smart key storage device, the vehicle key, the vehicle, and/or near a parking space. The physical marker may be stationary (e.g., a sticker having a fixed barcode) or dynamic (e.g., an electronic display, such as an e-ink display, configured to display a barcode). A dynamic physical marker may be updated or changed, e.g., by the server 202.

In at least another illustrative aspect, a vehicle 208 may be able to determine the relative location of a parking spot (e.g., parking spot 206C). The vehicle 208 may comprise an image sensor. For example, an image sensor may be present in an autonomous or semi-autonomous driving system, such as a lane-monitoring system installed on the front of the vehicle. In another example, an image sensor may be a mobile unit installed in the vehicle, such as camera module adhered to a windshield (e.g., a dash cam). In yet another example, an image sensor may be a mobile device, such as a phone, that is tethered to the vehicle. Physical markers 212A-212C may be installed at parking spot systems at, adjacent to, or associated with each parking spot 206A-206C. One or more image sensors may scan, read, or capture data from the physical markers 212A-212C. The image sensors may be located within a vehicle that can be parked in the corresponding parking spot, or may be located within the mobile device 224. In order to allow a vehicle's image sensor to scan, read, or capture data from physical markers 212A-212C with ease, the physical markers 212A-212C may be appropriately positioned to face the vehicle, e.g., via stands 210A-210C. A location sensor (not shown) in the parking spot system may transmit locational information of the parking spot so that the user 222 can be informed of the location of the user's vehicle 208.

In at least another illustrative aspect, a user 222 may be able to locate and obtain directions to the user's vehicle 208. The server 202 may authenticate the user 222 via the user's mobile device 222, and/or may determine a vehicle 208 associated with the user 222. The server may obtain the vehicle's location, e.g., from a location sensor. The server 202 may guide the user 222 using an augmented reality (AR) application on the user's mobile device 224.

In at least another illustrative aspect, a user 222 may be able to view information regarding the requested vehicle 208 via the user's mobile device 224. The server 202 may authenticate the user 222 via the user's mobile device 224 and determine a vehicle 208 associated with a request by the user 222. The association may be based on data obtained by the mobile device 224 from image data associated with the vehicle 208 (e.g., based on the geometry of the vehicle, a physical marker associated with the vehicle, the location of the user 222, etc.). Also or alternatively, the server may track the vehicle and/or the user 222, e.g., from location sensors in the mobile device 224 and/or the vehicle 208. For example, a user 222 may request to view a vehicle using the mobile device 224. The server 202 may unlock the vehicle 208 (e.g., for inspection of an interior) after confirming that the location of the mobile device 224 is within a proximity of the vehicle 208 and/or parking spot 206C.

Figure 3:
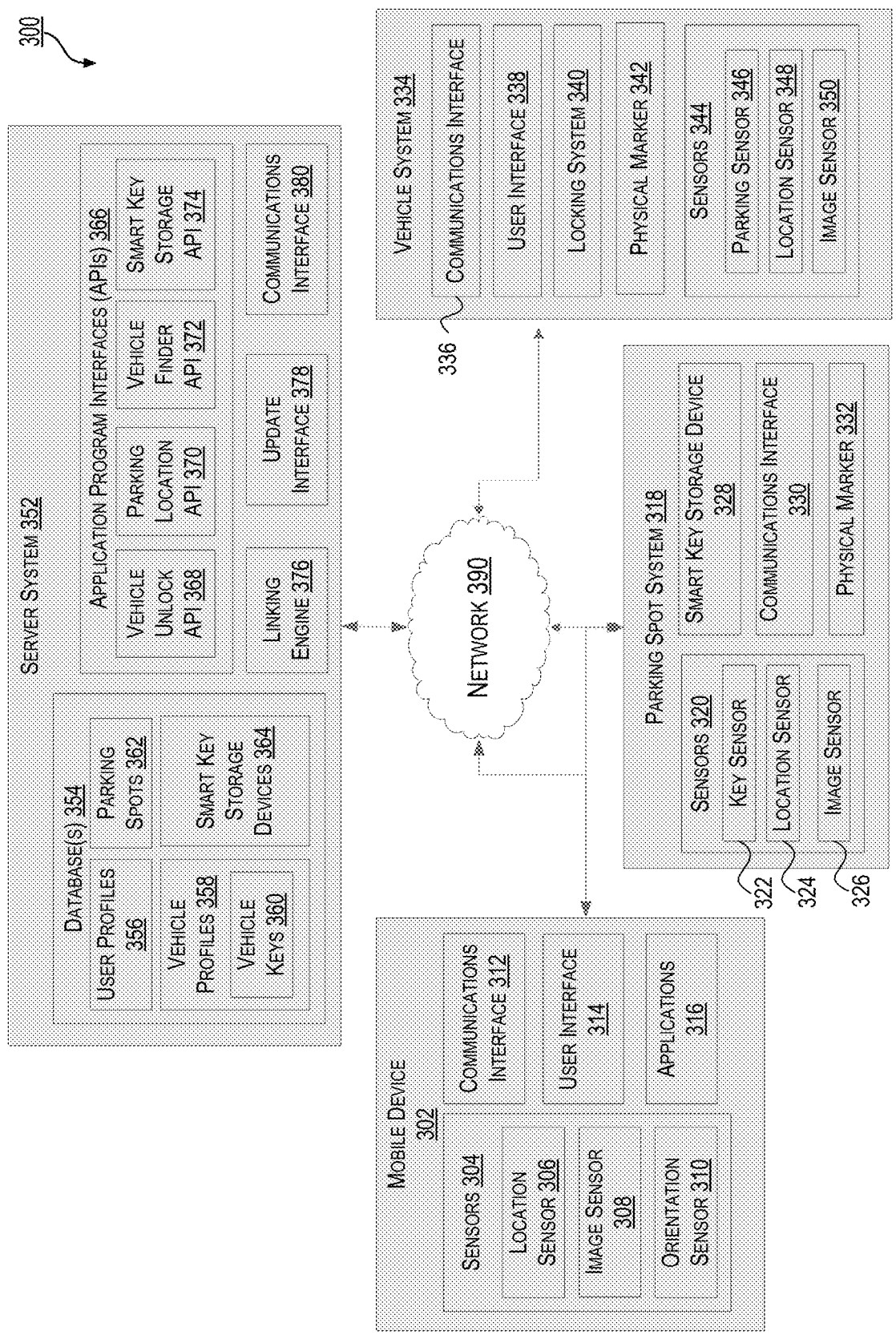
FIG. 3 depicts an example network in accordance with one or more illustrative aspects discussed herein.

FIG. 3 depicts an example network 300 in accordance with one or more illustrative aspects discussed herein. Each component or subcomponent shown in FIG. 3 may be implemented in hardware, software, or a combination of the two. Additionally, each component or subcomponent may include a computing device (or system) having some or all of the structural components described above for computing device 101. At a high level, the network 300 may include, for example, one or more mobile devices (e.g., mobile device 302), one or more parking spot systems (e.g., parking spot system 318), one or more vehicle systems (e.g., vehicle 334), and one or more server systems (e.g., server system 352). The mobile device 302 (e.g., a "user device") may comprise a mobile phone (e.g., smartphone), personal computer, tablet computer, laptop, or the like, which may include at least some of the features described herein. The mobile device 302 may belong to a user seeking to utilize systems and methods described herein, and may be used to send requests to and/or receive notifications from server system 352, e.g., via an application and/or program hosted, managed, and/or otherwise controlled by the server system 352. For example, the mobile device 302 may be used to request information about and/or access to a vehicle, such as the vehicle associated with vehicle system 334. The mobile device 302 may be a computing device distinct from the parking spot system 318, or the server system 352.

According to some aspects of the disclosure described herein, the mobile device 302 may comprise one or more components or features described below. Through a communications interface 312, the mobile device may be able to form wired and/or wireless data connections with other computing systems and devices, such as the one or more components of the parking spot system 318, the vehicle 334, and the server system 352, as described further below, via an internet and/or other telecommunications network (e.g., network 390). The mobile device 302 may include various sensors 304 configured to capture physical data (e.g., from physical markers); collect locational, geographical, and/or movement information; and/or transmit data. For example, the mobile device 302 may comprise a built-in or connected image sensor 308 (e.g., a camera, a scanner, etc.) that may scan and/or generate image and/or video data. A user may operate image sensor 308 to capture image and/or video data including a physical marker associated with parking sport system 318 and/or vehicle system 334, for example, a linear barcode, a matrix (2D) barcode (e.g., Aztec Code, augmented reality (AR) code, data matrix, quick response (QR) code, etc.) associated with a device and/or system. The sensors 304 within the mobile device may further include one or more orientation sensors 310 (e.g., gyrometer, solid-state gyroscope, accelerometer, compass, etc.) to measure a measure acceleration, direction, and/or rotation of the vehicle. Furthermore, the sensors 304 may include a location sensor 306 (e.g., global positioning system (GPS)) to determine a location of the mobile device. Other types of sensors may also be downloaded as applications 316. The mobile device 302 may also store user-specific identifying information within its memory (not shown), which can be accessed by or sent to the server 352, e.g., as metadata.

The user interface 314 may be a display coupled with input devices (e.g., keyboard, type pad, touch screen, mouse, buttons, icons, microphone, sensors, etc.) that allows a user to send requests, input information and/or view information. For example, the user interface 314 may allow a user to send a request to the server system 352 to test drive a vehicle near the user. The user interface 314 may then display instructions to the user to interact with a smart key storage device to access a vehicle key to test drive the vehicle. The mobile device 302 may also run programs or applications 316 on a user interface 314. One application or program may enable a user to use the systems and methods described herein to test drive a vehicle with limited human interaction. The application or program may be provided to the user device or hosted by server 352 (e.g., via an application program interface (API) 366). In some implementations, the mobile device 302 may include one or more subcomponents of computing device 101, shown in FIG. 1.

The parking spot system 318 may include one or more devices, computing systems, or sensors at, adjacent to, or associated with a parking spot of a vehicle. The parking spot system 318 may include one or more of the features and components described below. The parking spot system 318 may include various sensors 320 configured to capture physical data (e.g., from a physical marker on mobile device 302 or on a vehicle parked in a vehicle spot at, adjacent to, or associated with the parking spot system 318); collect locational or geographical information (e.g., via location sensor 324); track the presence, absence, removal, or replacement of keys (e.g., via key sensor 322); and/or transmit sensor data. For example, the parking spot system 318 may include a built-in or affixed image sensor 326 (e.g., a camera, a scanner, etc.) that may scan and/or generate image and/or video data. These data may include, for example, a linear barcode, a matrix (2D) barcode (e.g., QR code, AR code, etc.). Thus, a user may present a mobile device with a downloaded or displayed physical marker to the image sensor 326 so that the image sensor can capture or register a requisite image or video data (e.g., linear barcode, matrix barcode, etc.). In some implementations, as a vehicle is being parked into a parking spot at, adjacent to, or otherwise associated with the parking spot system 318, the image sensor 326 may be able to detect a physical marker on the vehicle.

The parking spot system 318 may comprise a smart key storage device 328, and a communications interface 330 to establish wireless, wired, or network connections with one or more other systems (e.g., the mobile device 302, the server system 352, the vehicle systems 334, etc.) The smart key storage device 328 may be a compartment, container, storage facility, or similar apparatus ("storage compartment") having an entry that can be locked or unlocked. The entry may be a door, lid, chute, and/or other panel ("storage door") that could be electronically locked or unlocked to deny or allow access to contents within the storage compartment. A key, key fob, remote, or electronic device for accessing a vehicle ("vehicle key") may be a content that can be stored in the storage compartment of the smart key storage device 328. As described above, it is to be understood that the vehicle key need not be restricted to conventional mechanical keys but may also include electronic devices, remotes, key fobs, and other means for accessing a vehicle. The vehicle key and the smart key storage device 328 may each have their own unique identifiers. For example, a first identifier may correspond to the smart key storage device and a second identifier may correspond to the vehicle key. An association between the specific smart key storage device and a specific vehicle may be formed using their respective identifiers at the server system 352. The key sensor 322 may be located within the smart key storage device 328 and may track the presence, absence, removal, and/or replacement of the vehicle key within the storage compartment. The key sensor 322 may be an electronic device that transmits radio signals to the storage compartment to monitor whether an object is present. Also or alternatively, the key sensor 322 may be an image sensor that reads or detects an identification on a vehicle key (e.g., a linear barcode, a matrix barcode, etc.). Also or alternatively, the key sensor 322 may be an RFID reader that reads or detects radio frequency emitted by the vehicle key. Upon detection of a presence and/or replacement of a vehicle key in the storage compartment, the key sensor 322 may recognize that the detected vehicle key is a correct vehicle key via a determination that an identification of the vehicle key (e.g., an RFID, linear barcode, matrix barcode, etc.) matches an identification of the vehicle key that is associated with the smart key storage device 318. The determination of whether the detected vehicle key is the correct vehicle key, and the association may occur at the server system 352. Sensor data from the key sensor 318 may thus be sent to the server system 352 via a network 390.

The parking spot system 318 may further comprise a physical marker 332. The physical marker 332 may be a linear barcode (e.g., universal product code (UPC)), matrix barcode (e.g., QR code, AR code, etc.), or an RFID tag. The physical marker 332 may be utilized by a scanner, image sensor, and/or reader, e.g., on the mobile device 302 or the vehicle. For example, a user seeking to obtain a vehicle key from the smart key storage device 328 may be instructed to present scan, capture, and/or register the physical marker 332 (e.g., a QR code) using an image sensor 308 of the mobile device 302. The image sensor may be used by an application 316.

The vehicle 334 may include one or more devices, computing systems, circuitry or sensors that are interior to, exterior to, or otherwise associated with a vehicle. The parking spot system 318 may include one or more of the features and components described below, according to some aspects of the present disclosure. For example, the vehicle 334 may include various sensors 334 configured to capture a state of the vehicle (e.g., parking sensor 346); collect locational or geographical information (e.g., location sensor 348); scan, read, or capture image or video (e.g., image sensor 350); and/or transmit sensor data. For example, a parking sensor 346 may detect when a vehicle is being parked or is in a "parked" state. The parking sensor 346 may be an accelerometer that recognizes a vehicle parking based on a change in acceleration of a component of the vehicle (e.g., that the vehicle has ceased movement for a threshold time). Also or alternatively, the parking sensor 346 may be an image sensor reading when an indicator for parking is turned on, or a sensor (e.g., an ODBII-compatible sensor) that detects a change in a mechanical structure of the vehicle (e.g., brakes, clutch, etc.) as the vehicle is parked. The vehicle 334 may include a location sensor (e.g., a global positioning service (GPS)) to capture and present a location of the vehicle. In some implementations, the vehicle 334 may include an image sensor 350 that scans, reads, or captures a physical marker at a parking spot (e.g., physical marker 332 of the parking spot system 318), as the vehicle parks or approaches the parking spot. From data captured from the physical marker 332, the image sensor 350 may allow the server system 352 to determine the locational information of the parking spot. For example, the server system 352 may have a list of known locations associated with identifiers and other data captured by sensors from physical markers. As discussed herein, there may be a physical marker located on one or more of the parking spot system (e.g., physical marker 332), the vehicle key, or the vehicle system 334 (e.g., physical marker 342), according to some aspects of the present disclosure.

Additionally or alternatively, the vehicle may include a physical marker, e.g., physical marker 342, which may comprise a linear barcode, matrix barcode, RFID tag, etc. Thus, in some aspects, a user could rely on an image sensor 326 of the parking spot system 318 to scan a physical marker on the vehicle (e.g., physical marker 342), rather than use the mobile device's image sensor 308 to scan a physical marker 332 of the parking spot system 318. Thus, the parking spot system 318 may comprise an image sensor 326 that may scan the physical marker 342 to determine if/where the vehicle 334 is parked. This may be an alternative to the vehicle 334 recording the physical marker 332, such as may be described in FIG. 6. The physical marker may be stationary (e.g., a sticker having a fixed barcode) or dynamic (e.g., an electronic display configured to display a barcode). For example, a dynamic physical marker may be updated or changed by the vehicle 334 and/or by one or more external systems (e.g., mobile device 302, parking spot system 318, server system 352, etc.). In some implementations, a sensor 320 from the parking spot system 318 (e.g., image sensor 326) or a sensor 304 from the mobile device 302 may scan, read, and/or capture data from physical marker 342. For example, an electronic sensor from the mobile device 302 may capture data from the physical marker 342 on the vehicle, and cause the vehicle to unlock or lock. The vehicle 334 may include a locking system 340 that can electronically and/or mechanically cause the vehicle to unlock or lock based on signals received, e.g., from the mobile device 302.

The vehicle 334 may also include a user interface to allow a user (e.g., a test driver such as user 222) to view sensor data (e.g., location, vehicle state, parking spot information, etc.) received from the above-described sensors, or communicate with external systems. The vehicle 334 may send information to or receive information from other systems (e.g., the mobile device 302, the parking spot system 318, the server system 352, etc.) over a network 390, via communications interface 336. The communications interface 336 may comprise a wireless communications interface, such as a cellular connection (e.g., LTE, 5G), a Wi-Fi connection (e.g., Wi-Fi 5 or Wi-Fi 6), or a Bluetooth tether to a mobile device 302.

The server system 352 may comprise one or more remote, local, and/or connected computing systems or servers managing one or more functions of the above-described systems (e.g., the mobile device 302, the parking spot system 318, the vehicle 334, etc.) to facilitate methods and systems described herein. For example, in some implementations, server 352 may be connected to the parking spot system 318. At a high level, the server system may comprise one or more databases 354, application program interfaces (APIs) 366, a linking engine 376, an update interface 378, and a communications interface 380. The update interface 378 and linking engine 376 may form a database management application, software, or plug-in that may be used to perform create, read, update, or destroy (CRUD) functions with respect to data stored in the one or more databases 354. For example, the linking engine 376 may be used to form associations or link suitable data from different databases together, and/or to create new data based on associations or linkages. The update interface 378 may be used to update databases (e.g., by adding or deleting) data stored in the one or more databases 354 based on instructions from other parts of the server system 352 (e.g., computer readable instructions stored in memory of an API) or information received from one or more external systems (e.g., the mobile device 302, the parking spot system 318, the vehicle 334, etc.). The server system 352 may send information to or receive information from the external systems over a network 390 via communications interface 336.

The server system 352 may include one or more databases described below. For example, the server system 352 may include a database of user profiles 356, which store identifying or biographical information pertaining to a user. The user profile may be based on or associated with an identifier of a mobile device of the user (e.g., mobile number, device identifier, etc.).

Also or additionally, the sever system 352 may include a database of known parking spots 362, e.g., based on a geographic region. For example, the database of parking spots 362 may store identifiers of parking spots within a predetermined distance from a designated address or location. The address or location may be based on the location of a user, which can be found using a location sensor, e.g., of the mobile device 302 or of the vehicle system 334. Thus, a database of parking spots 362 for the example environment illustrated in FIG. 2 may include identifiers of parking spots 206A-206C.

Also or additionally, sever system 352 may include a database of vehicle profiles 358. The vehicle profiles may identify vehicles, e.g., by vehicle identification numbers, license plate numbers, and/or or other vehicle descriptors. In some examples, a vehicle may be identified based on an identifier of its vehicle key (e.g., a vehicle key ID). The list of vehicles may depend on the systems and methods for which the server 352 is being utilized. For example, the vehicle profiles database 358 may identify vehicles that one or more users may test drive with limited human interaction based on systems and methods described herein. In some implementations, the server 352 may include a database for vehicle key IDs 360, and this database may be a part of the database of vehicle profiles 358 (as shown) or as a separate database. The database of vehicle key IDs 360 may list vehicle key IDs for vehicles, e.g., that a user can test drive with minimal human interaction. Furthermore, the database may list a status for each vehicle key, e.g., whether the vehicle key is stored within the smart key storage device, whether it has been removed by a user, etc. The vehicle profiles database 358 may comprise various characteristics of the vehicles. For example, the vehicles profile database 358 may store make information, model information, vehicle class (e.g., 4-door sedan, minivan, sports coupe, heavy-duty truck), color, seat arrangement, feature package, mileage, model year, price, or any other such information that might be relevant to a purchaser (e.g., wheel size, sunroof, etc.).

Also or additionally, the sever system 352 may include a database for smart key storage devices 364, which may identify smart key storage devices by unique identifiers. The list of smart key storage devices may be based on a geographic region, or may be independent of its geographic location. For example, the identifiers for the smart key storage devices may be manually stored, and the smart key storage devices may be tracked over a network 390. The database for the smart key storage devices 364 may indicate a status for each smart key storage device, e.g., whether a vehicle key is stored, whether the vehicle key is correct, whether the storage door is open.

The server system 352 may include one or more APIs described below. The server system 352 may include, e.g., an API for an application for unlocking vehicles using a mobile device (e.g., vehicle unlock API 368), an API for an application for tracking a parking location using a parking sensor (e.g., parking location API 370), an API for an application for finding a vehicle using a mobile device (e.g., vehicle finder API 372), and/or an API for an application for test driving a vehicle with minimal human interaction using a smart key storage device (e.g., smart key storage API 374).

Figure 4:
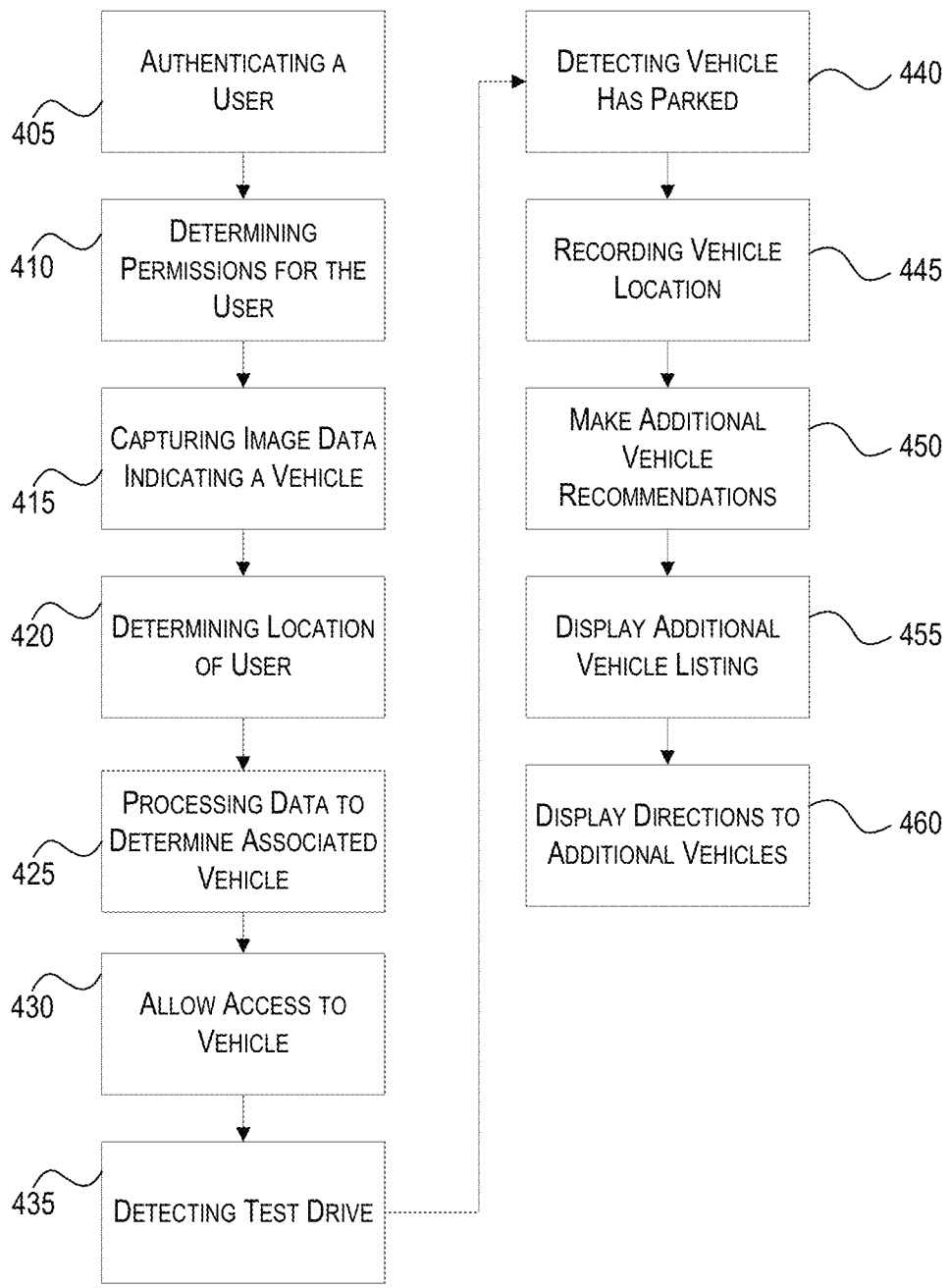
FIG. 4 depicts a flow diagram of an example method for facilitating automated vehicle access in a retail environment in accordance with one or more illustrative aspects discussed herein.

FIG. 4 illustrates an example method for facilitating automated vehicle access in a retail environment. The method may utilize modern technology to provide a user with access to a vehicle (e.g., vehicle system 334) without the need for an in-person salesman, while managing inventory and vehicle access. Modern vehicles may employ systems (e.g., vehicle system 334) that provide electronic access to vehicles (e.g., access to an interior using locking system 340). By identifying a user that is authorized to access the vehicle, and by confirming that the user is in proximity to the vehicle, a server (e.g., server system 352) may allow a user to find a vehicle, access the vehicle (e.g., send a command to unlock the vehicle so that the user can inspect a vehicle or go for a test drive), see information about the vehicle, and/or find similar vehicles. The server may facilitate a user identifying a vehicle, accessing the vehicle, and identifying further vehicles as described herein. An application (e.g., application 316) of a mobile device (e.g., mobile device 302) may facilitate a user accessing the vehicle, and may provide feedback regarding the test drive to the server.

At step 405, the system may authenticate a user (e.g., a user 222). The user may be a user who wishes to view a vehicle (e.g., a vehicle 208, which may employ vehicle systems 334) for purchase. For example, the user may have entered a car lot, and may be looking at one or more vehicles to purchase. The user may access an application (e.g., application 316) to obtain a list of available vehicles for lease or purchase. The application may obtain the list from the server, which supply a list of inventory within a predetermined proximity of the mobile device. Authentication information (e.g., a password, a fingerprint, or any other information that may be used to verify the identity of the user) may be received by a mobile device, processed, and sent to the server.

At step 410, the system may determine permissions for the user. For example, the server may comprise user profile information associated with the user (e.g., user profiles 356). The user profile information may indicate information for the user such as credit worthiness, purchasing power, criminal history, or other such information that may be used to determine if the user is qualified for a vehicle. In some instances, the user may be pre-qualified, and a notice of pre-qualification may be sent to the user (e.g., in an email advertisement) to come look at a vehicle. Permissions for the user may be determined for multiple vehicles (e.g., a class of vehicles). Permissions may be determined as needed (e.g., determined for a particular vehicle after step 525).

At step 415, the system may capture image data indicating a vehicle (e.g., vehicle 334). A mobile device (e.g., mobile device 302) may capture (e.g., using an image sensor 308) image data of a vehicle, or image data of a physical marker (e.g., physical marker 332) corresponding to the vehicle. The physical marker may comprise a matrix barcode (e.g., QR code, AR code, etc.), as discussed above. The mobile device may display a prompt to a user to take an image of the matrix barcode. A user may input a code (e.g., an alphanumeric code written on the physical marker, such as a dealer window decal on a vehicle) on the mobile device using a user interface (e.g., user interface 314). The mobile device may capture image data of the vehicle itself (e.g., one or more images of the vehicle, which may be used to determine the vehicle).

At step 420, the system may determine a location of the user. A location sensor (e.g., location sensor 306 of a mobile device 302) may determine a location and transmit the location to the server. Location information can be determined via context or through a determined location. For example, location information may comprise image data (e.g., image data depicting a vehicle or physical marker at a known location), referential location data (e.g., coordinates or a parking space number), GPS information for processing, or any other such information. In some instances, there may be security concerns with remote access. For example, a user could be a teenager who is too young to test drive a vehicle. In another example, a malicious person could utilize stolen credentials to allow access to a vehicle from a foreign country. Thus, it may be advantageous to confirm a proximity between the user (e.g., using a recently authenticated mobile device 302) and the vehicle (e.g., before a user is allowed to unlock a vehicle and view the interior). The system may determine a threshold proximity between the mobile device and the vehicle before allowing the vehicle to unlock. The location of the user may also be used to confirm that the intended vehicle is to be unlocked (e.g., by compiling a list of nearby vehicles to be cross-referenced against an image of a vehicle).

At step 425, the system may process the image data to determine the vehicle. The mobile device may process data locally, and/or the mobile device may transmit data to the server to be processed remotely. The mobile device may take one or more images of the vehicle, which may be used (e.g., by the mobile device 302 or the server 352) to determine the vehicle via image processing. For example, the system may determine a vehicle based on identifying the geometry or an image likeness above a threshold corresponding to the vehicle, such as by using machine learning to compare the depicted vehicle to a database of known vehicles. For example, a make, model, color, trim, and/or year of the vehicle may be determined using image processing. The one or more images of the vehicle could be cross-referenced with location information to determine the vehicle. For example, the image of the vehicle may be compared only with vehicles within a threshold proximity of the determined location of the user. An image of a physical marker could also be processed to determine an indicator that may correspond to an entry for the vehicle in a database (e.g., vehicle profiles 358). For example, the mobile device may detect a QR code, transmit an identifier based on the QR code to the server, and the server may determine a database entry indicating a particular vehicle assigned to the identifier. A physical marker may be associated with a parking spot (e.g., one of parking spots 206A-206C), and the system may record what vehicle is in that parking spot. In some instances, the user may be able to confirm, using the mobile device, that the correct vehicle has been selected, and/or update the system with what vehicle is present if there is an error. In some instances, a combination of the above (e.g., a physical marker correlated with a location of the user) could be used to confirm the identity of the vehicle (e.g., that the vehicle at the physical marker is within a threshold proximity to the location of the user).

In some instances, the user may be prompted to confirm the identity of the vehicle. Multiple vehicles may exist that are within a threshold similarity to the vehicle depicted in an image and/or are within a threshold proximity to a user. For example, a lot may have multiple white SUVs of a given model, and though they may differ in model year or other features they may look too similar to distinguish in an image. The user may be prompted with a list of vehicles in order to identify what the vehicle is. For example, the listing may indicate parking spaces associated with the vehicles, feature information (e.g., a model year that can be cross-referenced with a dealer sticker on a window), license plate information, or other such information that may be used to confirm the vehicle. In some instances, after receiving the confirmation, the location of the user device may also be confirmed (e.g., GPS information may only indicate that a phone is within a wide radius in a lot, but the vehicle confirmation may identify that the user is in a particular location relative to the vehicle). This may have the advantage of providing a more precise location and/or orientation, which may be used for providing more accurate directions (e.g., as discussed below in FIG. 6 and/or FIG. 7).

In some instances, a parking spot system (e.g., parking spot system 318) may capture image data. The mobile device may display an image, such as a QR code or barcode. A user may hold the mobile device up to an image sensor (e.g., image sensor 326), so that the parking spot system may detect the image. If the parking spot system scans an image of the mobile device, the server may determine a user associated with the mobile device, and determine whether to grant access to a vehicle known to be associated with physical marker (e.g., consistent with the systems and methods described herein). For example, a vehicle may be stored at a parking spot, and by scanning an image (e.g., a mobile device scanning a physical marker, or a camera at the parking spot scanning a marker on the mobile device), the system may determine that the user is at a location associated with that particular vehicle.

In some instances, the system may receive a request for a vehicle without first receiving an image of a vehicle. For example, the user may indicate one or more characteristics (e.g., preferences), such as make of vehicle, model of vehicle, year of vehicle, mileage of vehicle, color of vehicle, trim of vehicle, price of vehicle, location of vehicle or dealership (which may be an area, such as a radius around a location or zip code), type of vehicle (e.g., SUV, crossover, sedan), attributes (e.g., number of seats, number of doors, leather seats, heated seats, trim color), or any other such characteristic. The vehicle may be identified to the user based on the characteristics. For example, the server may identify one or more options of vehicles corresponding to the characteristics using a search. The user may select the vehicle from those options. The server may then indicate where the vehicle is on the lot using a parking space number, or using augmented reality (AR) indicators as discussed herein. For example, a user may request information regarding the vehicle and/or access to the vehicle. A request may be received at the mobile device, and may be transmitted to the server. The request may be received using a user interface, such as a website, application, or other such interface. After receiving the request, the system may direct the user to the vehicle, such as by displaying directions as discussed in FIG. 6 and/or FIG. 7.

The system may sort inventory based characteristics. The server may retrieve an inventory list from the inventory management database (e.g., database 354). The inventory list may indicate what vehicles are available at one or more dealer sites, and may also indicate when the vehicles are available (e.g., if a vehicle is unavailable due to a test drive, maintenance, cleaning, etc.). The server may process the inventory list based on the characteristics (e.g., to be sorting or formatting vehicles based on the user preferences). Further, vehicle recommendations may be generated, for example, using demographic information associated with the mobile device. The recommendations may be determined by the server based on user profile information for a user known to be associated with the mobile device. For example, a minivan in a particular price range may be recommended based on a user having a particular income and multiple children. In some instances, such as if a dealer has too many test drives assigned for a given day, the system may not allow a test drive to be scheduled on that day.

At step 430, the system may allow access to the vehicle. In some instances, the user may be permitted to access an information sheet corresponding to the vehicle. For example, the mobile device may display a list of attributes and/or characteristics of the vehicle to the user (e.g., car features and associated pricing information). If the system determines that the user is permitted to unlock the vehicle and/or is in proximity to the vehicle, the system may send a command to unlock the vehicle. The server may utilize a vehicle unlock interface (e.g., API 368) to send an unlock command (e.g., wirelessly or via a wired connection from communications interface 380 to communications interface 336) to a locking system (e.g., a locking system 340 of a vehicle 334). The vehicle may unlock in response to the command In some instances, the locking system may be a locking system standard to that vehicle. In other instances, the locking system may be an aftermarket system installed on the vehicle. In some embodiments, the locking system may enable operation of the vehicle, such as by starting a vehicle and allowing it to be driven. In other instances, the locking system may unlock a vehicle and provide access to a key fob needed to start the vehicle. In yet other instances, the locking system may work in conjunction with other systems. For example, the locking system may provide the means of accessing the vehicle, but a smart key storage device (e.g., smart key storage device 364) for starting the vehicle may be inside or outside the vehicle, and may be accessed according to systems and methods described herein in order to access a key to start the vehicle.

At step 435, the system may detect the start of a test drive. The system may detect the start of the test drive based on movement information from the mobile device, such as by using information from an orientation sensor (e.g., orientation sensor 310) or a location sensor (e.g., location sensor 306). The system may detect the start of the test drive based on detecting a car has gone into drive using a parking sensor (e.g., parking sensor 346). The system may detect the start of the test drive based on detecting that the vehicle is in motion by following location information from the location sensor. The system may detect the start of a test drive based on a connection between two or more communication interfaces (e.g., between the communications interface 312 and the communications interface 336). For example, an application (e.g., application 316) of the mobile device may automatically trigger an attempted wireless connection (e.g., Bluetooth) to the vehicle when a test drive has been authorized. If a connection is connected, this may indicate that the mobile device is in close proximity to the vehicle. In some instances, the system may use location information to determine a test drive is within parameters. For example, the system may limit the number of miles driven, limit the amount of time driven, confirm the user is driving the vehicle based on a proximity, confirm the vehicle stays within a certain proximity of a lot, and/or track that the test drive is safe for the vehicle.

At step 440, the system may detect that a vehicle has parked. The system may detect the end of the test drive based on movement information from the mobile device, such by using information from an orientation sensor (e.g., orientation sensor 310) or a location sensor (e.g., location sensor 306). For example, the system may determine that the mobile device has ceased high-speed motion after a period of time. In another example, the user interface of the mobile device may comprise a prompt for the user to indicate that the test drive has ended (e.g., a prompt may be displayed after the mobile device ceases high speed motion for a set period of time). The system may detect the end of the test drive based on detecting a car has parked using the parking sensor. For example, the system may detect that the vehicle has been shifted into park. In another example, the system may use an image sensor to detect a physical marker indicative of a parking space, and/or to detect a gear shift indicator signaling "park." The system may detect that the test drive has ended based on a disconnection between two or more communications interfaces (e.g., the mobile device disconnecting Bluetooth from the vehicle). The system may also verify that the test drive has ended by confirming that the location of the mobile device and/or the vehicle is at the location of a designated parking facility.

In some instances, the system may permit a user to purchase the vehicle after conducting a test drive. For example, after indicating that a drive has ended, a mobile device may prompt the user to purchase or lease the vehicle. The user may have the option to complete the transaction on the mobile device, may be directed to a website or representative to complete the transaction, and/or may be given the vehicle for an extended trial period (e.g., a 3-day trial upon receipt of a deposit). This may have the advantage of permitting a user to purchase a vehicle with little-to-no interaction with a human sales representative.

At step 445, the system may record the vehicle location. Location information may be derived from the location sensor (e.g., location sensor 306 or location sensor 348). In some instances, particularized information for a parking spot (e.g., a parking spot 206A-206C) may be used to determine where a vehicle is parked. The user may use the mobile device to record a physical marker, such as discussed in step 415, to "check in" the vehicle at a given parking spot (which may or may not be where the same spot from where the vehicle was retrieved, and may even be a different lot). In some instances, the vehicle may determine where it is parked using an image sensor (e.g., image sensor 350) to record a physical marker, such as using one or more systems or methods as described herein.

At step 450, the system may determine additional vehicle recommendations. The server may determine one or more available vehicles on a lot based on the characteristics. In some instances, the processing may be performed by the server (e.g., before transmitting results to the mobile device). In other instances, the mobile device may determine available vehicles based on an inventory list retrieved from the server. For example, there may be one or more other vehicles that are often viewed or purchased by someone who viewed the vehicle. The server may determine one or more preferred alternative characteristics to recommend based on demographic information. For example, a consumer with children who has asked to look at SUVs may also be presented with options for 4-door sedans or minivans that can accommodate children. In another example, the system may determine that another vehicle has a popular feature (e.g., heated seats, sunroof, etc.) not present on the vehicle being viewed, and may recommend the alternative vehicle for viewing. This may have the advantage of promoting sales by presenting the consumer with additional vehicles they might consider.

At step 455, the system may display a listing of the additional vehicle recommendations to the user. For example, the system may cause a display of the mobile device to display the listing of additional vehicles. A user may make one or more selections (e.g., using a touchscreen interface) of one or more vehicles to be viewed. The listing may comprise a location of where the vehicles are located. For example, the listing may provide a map with markers indicating the location of the additional vehicles. In another example, the listing may provide parking spot numbers (or other such index) notating the location of the additional vehicles.

At step 460, the system may display directions to one or more of the additional vehicles (e.g., based on the one or more selections). For example, the system may display directional indicators as may be discussed in FIG. 6 and/or FIG. 7. The system may determine an optimal route based on the selections. For example, the system may determine a shortest path to traverse between all the vehicles (e.g., a shortest total path that walks the user by each selected vehicle). The system may organize vehicles for optimal viewing. For example, the system may direct a user to travel between each vehicle of a first model before moving to another model. In another example, the system may start a user with a more expensive model before moving to less expensive models (e.g., to promote higher sales).

Figure 5:
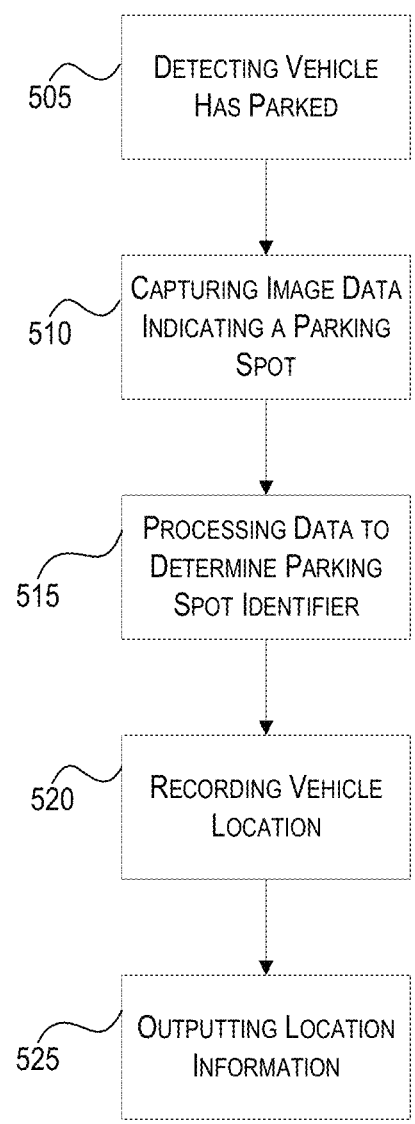
FIG. 5 depicts a flow diagram of an example method for an automated vehicle tracking system in accordance with one or more illustrative aspects discussed herein.

Having discussed a method for facilitating access to vehicles as shown in FIG. 4, discussion will now turn to a method for an automated vehicle tracking system as shown in FIG. 5.

FIG. 5 illustrates an example method for an automated vehicle tracking system. Modern vehicles may employ imaging systems (e.g., image sensor 350). For example, an accident avoidance system and/or lane-keeping assistant system may employ one or more front-mounted cameras. In another example, a vehicle may employ one or more cameras to record video footage of a drive for insurance purposes (e.g., a dash cam). These imaging systems may be standard to a vehicle, aftermarket components for a vehicle, or may be modular units that may be moved between vehicles (e.g., a camera that may be mounted to a windshield with a suction cup). By utilizing a physical marker (e.g., physical marker 332) at a parking space, the vehicle may capture an image of the physical marker to determine where the vehicle is parked. The parking location may be sent to a server (e.g., server 352) and/or displayed to a user (e.g., using a mobile device, such as a mobile device 302, or a vehicle, such as a vehicle 334). The user may be a user 222.

At step 505, the system may determine that a vehicle has parked. The system may detect the end of the test drive based on movement information from the mobile device, such as an orientation sensor (e.g., orientation sensor 310) or a location sensor (e.g., location sensor 306). For example, the system may determine that the mobile device has ceased high-speed motion after a period of time. In another example, a user interface (e.g., user interface 314 of a mobile device 302) may comprise a prompt for the user to indicate that the test drive has ended (e.g., a prompt may be displayed after the mobile device ceases high speed motion for a set period of time). The system may detect the end of the test drive based on detecting a car has parked using a parking sensor (e.g., parking sensor 346). For example, the system may detect that the vehicle has been shifted into park. In another example, the system may use an image sensor (e.g., image sensor 350) to detect a physical marker (e.g., physical marker 332) indicative of a parking space, and/or to detect a gear shift indicator signaling "park." The system may detect that the vehicle is parked based on a disconnection between two or more communication interfaces a communications interface 312 and a communications interface 336 (e.g., the mobile device 302 disconnecting Bluetooth from the vehicle 334). The disconnection may indicate that a user has left the vehicle. The system may determine that a user has left the vehicle (and that the vehicle is parked) based on a location of the mobile device 302 moving away from the vehicle 334. In some instance, the system may determine or confirm that a vehicle is parked based on detecting a physical marker 332 associated with a parking space, such as discussed in step 510.

At step 510, the system may capture image data indicating a parking spot for a vehicle. An image sensor (e.g., image sensor 350) may detect an image of a physical marker (e.g., physical marker 332) indicating a parking spot. The physical marker may comprise a matrix barcode (e.g., QR code, AR code, etc.), as discussed above. For example, the image sensor may continuously scan (e.g., continually inspecting frames of a video feed) for a physical marker (e.g., a QR code). In another example, the image sensor may capture one or more images when the system determines that the vehicle has been parked, such as may be determined in step 505. In yet another example, the system may use a camera to detect that a vehicle has parked in a parking space (e.g., by identifying the geometry of the vehicle, by identifying a license plate of the vehicle, or by using one or more other methods described herein, such as a combination of the above using machine learning). The image may comprise a location tag in a predetermined zone of the image. For example, a physical marker may be placed at a specified height and location in a parking space, wherein the physical marker comprises a location tag (e.g., a QR code). If a location tag corresponding to a physical marker is detected in a predetermined zone of the image (e.g., the far right of the image) it may not be considered (e.g., a physical marker on the far right of an image may indicate passing a parking spot rather than parking in it). If the location tag corresponding to the physical marker is detected in the predetermined zone of the image (e.g., the center of the image at the specified height), this may indicate the vehicle is parked in front of the physical marker.

In some instances, a user may manually capture the image data. A mobile device (e.g., mobile device 302) may capture (e.g., using an image sensor 308), a physical marker corresponding to the vehicle (e.g., physical marker 332). The mobile device or vehicle may comprise a prompt wherein the user can request the mobile device or vehicle capture image data. A user may input a code (e.g., an alphanumeric code written on the physical marker 332) using the user interface (e.g., the user interface 314 or the user interface 338).

At step 515, the system may process the image data to determine a parking spot identifier. In some instances, a device capturing the image data (e.g., the vehicle) may process the image data and determine an identifier from the data. For example, the vehicle may detect a QR code, and determine an identifier from the QR code. In other instances, the image data may be transferred to another device for processing. For example, the vehicle may transfer image data to a server or a tethered mobile device (which may in turn send data to the server). The parking spot identifier (possibly along with an identifier of the vehicle) may be transmitted to the server.

At step 520, the system may record a location of the vehicle. After receiving and/or processing the parking spot identifier (and/or the identifier of the vehicle), the server may determine a database entry for the parking spot that corresponds to the parking spot identifier. The server may store information in the entry for the parking spot, such as an indicator of the vehicle 334 an indicator of the mobile device, and/or a user (which may be an indication of a user profile, such as a user profile 356). The server may alternatively, or in addition, store information in an entry for an associated user profile or vehicle profile (e.g., vehicle profile 358), such as a location (e.g., GPS coordinate) for the vehicle, a parking spot for the vehicle, etc.

At step 525, the system may output location information for display. The server may send parking spot information (e.g., an indicator of a parking space, such as a lot level and/or spot number) to the mobile device or vehicle. The mobile device or vehicle may display the parking spot information on its respective user interface (e.g., user interface 314 and/or user interface 338).

In some instances, the parking spot information may be displayed in response to a user request. A user may be walking to a vehicle and may wish to determine where his or her vehicle is parked. For example, a user may be returning from a long flight, and wish to locate a vehicle in an airport parking deck. In another example, a user may wish to locate a vehicle for rent, lease, or purchase in a retail lot. The user may use the mobile device to access the parking spot information (e.g., from the server) and display an indication of the parking spot on the user interface. In some instances, the parking spot information may be utilized with one or more systems described herein. For example, the parking spot information may indicate a location of a vehicle for rent or purchase as described in FIG. 4. In another example, the parking spot information may be used in conjunction with a directional marker or AR marker to direct a user to a vehicle, such as described in FIG. 6 and/or FIG. 7.

Figure 6:
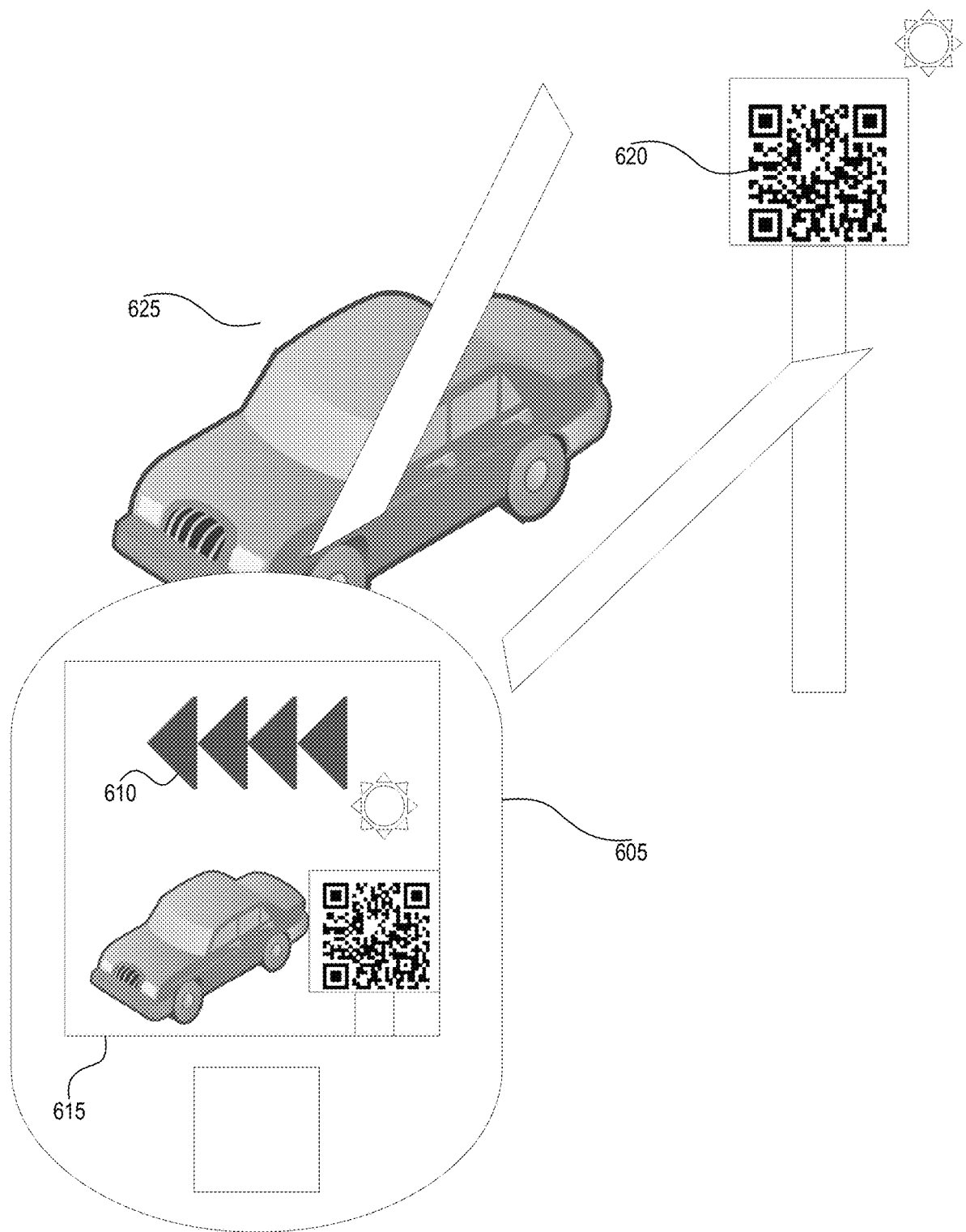
FIG. 6 depicts an example system for displaying an augmented reality (AR) indicator to direct a user to a destination in accordance with one or more illustrative aspects discussed herein.
Figure 7:
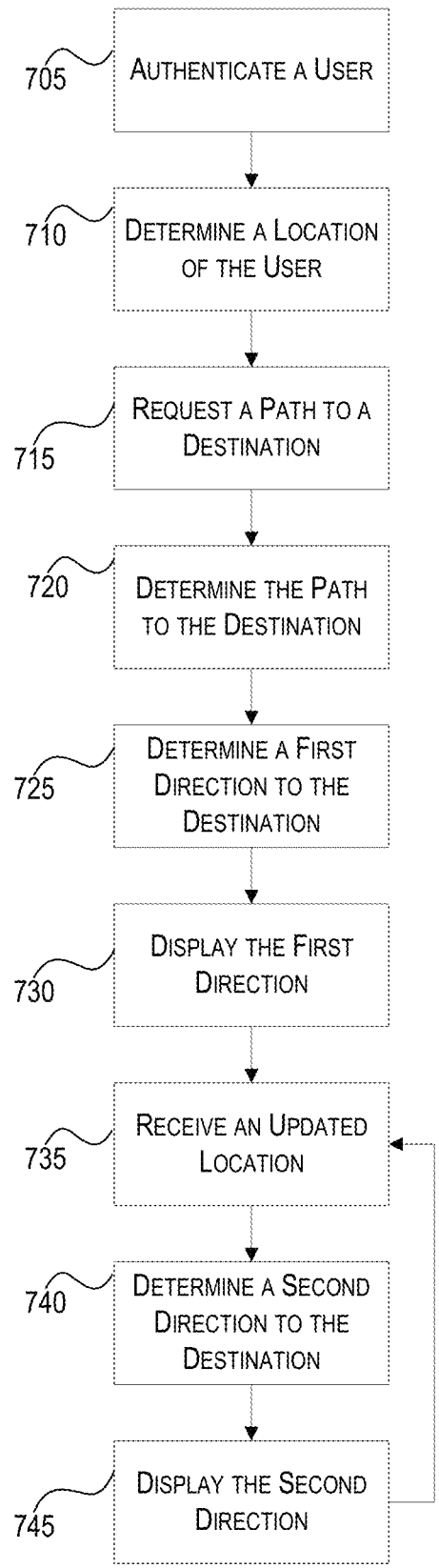
FIG. 7 depicts a flow diagram of an example method for displaying an AR indicator to direct a user to a destination in accordance with one or more illustrative aspects discussed herein.

Having discussed a method for an automated vehicle tracking system as shown in FIG. discussion will now turn to systems and methods for displaying one or more augmented reality directions as shown in FIG. 6 and FIG. 7.

FIG. 6 illustrates an example system for displaying an augmented reality (AR) indicator to direct a user (e.g., a user 222) to a destination. A device 605, which may be a mobile device 302, may be used to display (e.g., on a display screen 615) an indicator 610 that directs a user to a destination. While the device 605 is depicted as a mobile phone, the device 605 may be any mobile device, such as AR glasses, a tablet, etc. The destination may be any location, such as a location of a product in a store, a vehicle in a parking lot, or an exit from a building. For example, the destination may be the location of a vehicle, which may be received from a server (e.g., server 352). The device 605 may use an orientation sensor 310 and/or a location sensor 306 to determine the orientation of the indicator 610. For example, the device 605 may determine the relative location of a vehicle based on the location of the vehicle received from the server, a location of the device 605 derived from location sensor 306, and/or an orientation of the device 605 (e.g., a cardinal direction, angle, pitch, etc.) from an orientation sensor (e.g., orientation sensor 310).

In some instances, a physical marker 620 (e.g., QR code, AR code, etc.), which may be a physical marker 332, may be utilized to provide direction to the destination. The device 605 may scan the physical marker 620 to determine a location of the device 605. For example, an application (e.g., application 316) may determine a location of the device 605 based on detecting that it is in proximity to the physical marker 620. In another example, the application may determine the location of the device 605 based on identifying a vehicle 625, such as may be discussed above in FIG. 4. In another example, the device 605 may transmit information derived from the physical marker 620 to a server, which may return a location of the device 605. In this manner, a confirmed and/or predetermined location of the device 605 may be determined. For example, one or more predetermined paths may be created from the physical marker 620 to one or more destinations (e.g., vehicle parking spaces for one or more vehicles). The predetermined paths may be created manually or automatically. Upon scanning the physical marker 620, the device 605 may begin showing the path to the destination. The physical marker 620 may also be used to confirm orientation and location relative to the path. For example, a device 605 may be in an underground garage where location information (e.g., GPS data) or orientation information (e.g., a direction) may be limited or unavailable. The orientation of the physical marker 620 in real space may be known, such as knowing that the physical marker 620 is flat against a wall running east to west at a particular location. The device 605 may thus orient an indicator 610 based upon the known relative location and/or orientation of the physical marker 620. For example, if a parking spot is known to be one floor above a physical marker 620, a device 605 detecting a physical marker 620 in a stairwell may display an indicator 610 pointing up a flight of stairs. More than one indicator 620 may be used in succession. For example, a device 605 may capture physical markers 620 at additional vehicles along a route, each providing an indicator 610 directing a next step in a path. Each step of the path may direct the device 605 to another physical marker 620 in succession, such that a user can follow physical markers until a destination is reached.

The indicator 610 may be displayed using an overlay on the display screen 615. The device 605 may capture image data (which may be a live video feed) of the environment. the indicator 610 may be overlaid onto the image data for display in order to provide an augmented reality (AR) experience. The indicator may comprise an augmented reality direction. For example, the indicator 610 may be displayed as a two-dimensional or three-dimensional indicator overlaid on a video feed, wherein the indicator may indicate a direction. The indicator 610 may be relative to the environment. The device 605 may comprise an orientation sensor, such as a solid-state gyroscope and/or orientation sensor 310. The indicator 610 may be displayed based on an orientation received from the orientation sensor. For example, the indicator 610 may be adjusted in any direction to compensate for the orientation of the device. This may have the advantage of providing an accurate indicator 610 for a mobile device 605 that may be held at multiple angles. The indicator 610 may be a three-dimensional indicator 610, which may be overlaid such that the indicator 610 appears to "float" in the environment as a directional symbol pointing in three dimensions to a destination and/or providing the next direction for a path. This may provide the user with an AR experience with which the user may perceive directions relative to their environment in multiple dimensions.

FIG. 7 illustrates an example method for displaying an AR indicator to direct a user (e.g., a user 222) to a destination. A device (e.g., device 605) may display one or more AR indicators (e.g., AR indicators 610) to the user, wherein each AR indicator directs a user to a destination location (e.g., via one or more directions down a path). A system may facilitate determining a location of the device, the destination for the path, the path, and the one or more directions, such as described herein.

At step 705, the system may authenticate a user. The user may be a user who is utilizing a device (e.g., a device 605). For example, the user may have requested directions to a parked vehicle (e.g., a vehicle 334). The user may access an application (e.g., application 316), and request directions to a destination using a user interface (e.g., user interface 314). For example, the user may request directions to his or her vehicle. In another example, the user may request directions to a vehicle for rent or purchase. In yet another example, the user may request directions to a goods for sale at a retail location. In some examples, the directions may traverse between multiple vehicles (e.g., to a first vehicle, and then to one or more additional vehicles in a sequence). Authentication information (e.g., a password, a fingerprint, or any other information that may be used to verify the identity of the user) may be received by the device, processed, and sent to a server (e.g., server 352). The authentication information may be used to confirm who the user is, what information is associated with the user, and/or that the user is permitted access to the directions. For example, a user profile (e.g., user profile 356) may indicate that a particular user owns a particular vehicle located at a particular destination (e.g., a destination associated with a parking spot, such as parking spot 362). Directions to a particular destination may be conditioned on access. For example, a user may be given directions only to a vehicle they own, or to a vehicle they are permitted to rent or purchase. In some instances, directions may be in response to a user being given access. For example, a user may rent or purchase a good (e.g., a vehicle) using the user interface, and the user may be supplied directions to the good (e.g., directions to a parking spot of the vehicle) in return.

At step 710, the system may determine a location of the user. The device may determine a location based on feedback from a location sensor (e.g., location sensor 306). For example, the device may determine a location based on GPS data. The system may, alternatively or in addition, determine a location based on a physical marker (e.g., physical marker 620). The device may capture an image of the physical marker to determine a location (e.g., as discussed in FIG. 6). The physical marker may be placed at a known location (e.g., a parking space, a stairwell, a branch in a pathway, an entrance, an exit, etc.). For example, the physical marker may be placed on a window decal for a vehicle for sale, wherein the parked location of the vehicle is known. An association between the physical marker may be stored in an application (e.g., application 316) and/or in a database (e.g., database 354). If the device scans the physical marker, the system may determine that the device is at the known location.

At step 715, a request may be made for a path to a destination. The device may request a path to a destination. The path may be stored on the device and/or at the server. For example, the device may transmit, to the server, a request for a path to the destination. The destination may be obtained via an interface of the device, such as a user interface (e.g., user interface 314). The destination may be determined according one or more systems or methods described herein. For example, a parked location of a vehicle may be recorded as in FIG. 6. The user may request directions to the vehicle, and the server may determine the destination based on the parked location of the vehicle. In another example, the user may request to see a vehicle for purchase as in FIG. 4, and the server may determine a destination based on a parking spot system associated with the vehicle (e.g., parking spot system 318). The path may comprise multiple vehicles. For example, the path may first direct to a customer to a first vehicle, and then may direct a customer to an additional vehicle.

At step 720, a path to the destination may be determined. A path may comprise one or more directions from the device to the destination. The one or more directions may comprise one or more directional indicators (e.g., directional indicators 610). A path may be a route between the location of the device to the destination. The path may be determined based on shortest navigable distance between the device and the destination. For example, the path may comprise a first direction to proceed to a row of vehicles in a parking lot, a second direction to turn at the row, and a third direction pointing to a destination vehicle. The path may be partially or fully predetermined. For example, one or more physical markers may be placed around an area. Predetermined paths may be created to travel between the physical markers. If a device at a first physical marker requests a path to a destination, the system may determine a predetermined path from the first physical marker to a second physical marker closest to the destination. The device may follow the path until the second physical marker, at which point the device may point to the destination.

At step 725, a first direction for the path may be determined. The system may determine the first direction based on the location of the device and the path, such as may be described above regarding step 720. Paths and/or directions may be determined locally and/or remotely. A device may locally determine a path from the device to the destination (e.g., using a mapping application, such as Google Maps, on the device). A map of an area (e.g., a dealership lot) may be downloaded to the device for navigation and/or reference (e.g., as an overlay). A device may transmit a request for a path to a server, and the server may determine the path and transmit the path and/or directions to the device. For example, the server may receive a request for a path, determine a full path (e.g., a series of one or more directions) from the location of the device and the destination, and transmit the full path in one continuous transmission. In another example, the server may receive a request for a path, and transmit a first direction to the location. The server may then repeatedly receive updated locations from the device and transmit a new direction to the destination (from the respective updated location) after each location update. The device may also receive a plurality of directions to the destination initially, may transmit location updates intermittently, and may rely on the initial directions until and/or unless updated directions are received. This may have the advantage of assisting with communication lapses, as may happen in an underground garage.

At step 730, the first direction may be displayed. The first direction may comprise an indicator (e.g., indicator 610) displayed on the device. The indicator may be displayed as discussed in FIG. 6. For example, the indicator may be overlaid upon an environment to supply a first direction down a path and/or to a destination.

At step 735, a location update may be received. The device may determine a new location using one or more systems or methods as described herein. For example, the device may determine an updated location based on GPS data. In another example, the device may reach a first vehicle of a list of vehicles to be viewed. In yet another example, the device may encounter an additional physical marker, which may be an intermediary waypoint (e.g., the end of a row of cars) used to generate an updated location and send the user on to another destination. The location update may be sent from the device to the server.

At step 740, a second direction for the path may be determined based on the updated location. If the updated location is a point along a path, the second direction may comprise a second direction for the path. For example, the updated location may be the location of an additional vehicle on a list of vehicles to be viewed. The updated location may be a deviation from a previously defined path, so the system determines a new path (e.g., using the updated location as the location and repeating steps 710 to 720). For example, a user may stop and view a car not on the list, which may not be on the defined path. In some instances, a user may be directed to proceed down a path with multiple physical markers (e.g., a plurality of physical markers 620), as discussed herein. The directions may indicate that the user should scan an additional physical marker. When a user reaches each additional physical marker, he or she may be asked to scan the marker. A prompt or delay may exist between stops on a path. For example, a customer may be directed to a second vehicle for viewing, and may have information for that vehicle displayed. The user may have to select a prompt to indicate that the user is done viewing the second vehicle and wants directions to a third vehicle. The system may determine the new location based on the scan of the additional physical marker, and display a new direction from that additional physical marker (e.g., based on a known position of the additional physical marker). For example, a path to a first vehicle may have a marker at an exit door, a marker at a sub-lot, a marker at each row of vehicles, and a marker at each vehicle. This may have the advantage of allowing for straightforward directions to identifiable landmarks or traversal points (e.g., doors or crosswalks) for a user.

At step 745, the second direction may be displayed. The second direction may comprise an indicator (e.g., indicator 610) displayed on the device. The indicator may be displayed as discussed in FIG. 6. For example, the indicator may be overlaid upon an environment to supply a second direction down a path and/or to a destination. Steps 735 to 745 may be repeated until the system determines that the device is at the destination. The destination (e.g., a vehicle) may be indicated using an augmented reality marker overlaid on a display such as display 615 (e.g., an indicator arrow pointing to the vehicle, or a symbol representing a vehicle).

One or more aspects described herein may provide automated systems for tracking, locating, and/or accessing vehicles. This may have the benefit of reducing the manpower needed to store, sell, lease, or rent vehicles, while reducing the strain on the consumer. For example, a consumer may be able to quickly locate and access a vehicle for a test drive using a mobile application, which may have the advantage of allowing a user to avoid a pushy salesperson (which may also reduce overhead for a car dealer). The system may also have the advantage of allowing a car dealer or financier track inventory and the condition of that inventory. This may promote more efficient sales due to reduced friction for the consumer and reduced costs for the retailer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving, by a computing device and from a mobile device, vehicle identification information corresponding to a location of the mobile device;
determining, by the computing device and based on correlating the location of the mobile device with a plurality of vehicles proximate to the location, one or more possible vehicles that correspond to the vehicle identification information;
sending, by the computing device and to the mobile device, a request for confirmation of the vehicle of the one or more possible vehicles;
receiving, by the computing device and based on a user response entered at the mobile device, the confirmation of the vehicle;
determining, by the computing device and based on one or more characteristics of the confirmed vehicle, a listing of one or more additional vehicles different from the one or more possible vehicles;
sending, by the computing device and to the mobile device, the listing, wherein the listing comprises one or more relative locations for each of the one or more additional vehicles, wherein the one or more relative locations are relative to the vehicle; and
causing, by the computing device, display of one or more direction indicators corresponding to the one or more relative locations.

2. The method of claim 1, wherein determining the one or more possible vehicles comprises determining the one or more possible vehicles based on determining that each vehicle of the one or more possible vehicles satisfies a threshold similarity with the vehicle identification information.

3. The method of claim 1, wherein the vehicle identification information comprises a location identifier, and wherein the location of the mobile device is determined from the location identifier.

4. The method of claim 1, further comprising:
sending, to the mobile device, a request to confirm an identity of the vehicle, wherein the request comprises an additional listing of the one or more possible vehicles; and
receiving, from the mobile device, a confirmation of the vehicle.

5. The method of claim 4, further comprising updating, after receiving the confirmation, the location of the mobile device by determining a proximity of the mobile device to the vehicle.

6. The method of claim 1, wherein the determining the listing comprises:
determining, based on demographic information, one or more preferred characteristics of a user of the mobile device; and
determining the plurality of vehicles based on the plurality of vehicles being associated with the one or more preferred characteristics.

7. The method of claim 1, further comprising:
receiving additional location information corresponding to the plurality of vehicles;
updating a database with the additional location information; and
determining the one or more relative locations based on the additional location information.

8. The method of claim 7, wherein the additional location information comprises a parking image.

9. The method of claim 8, wherein the parking image comprises an image of a QR code corresponding to a parking space for the one of the one or more additional vehicles.

10. The method of claim 7, further comprising determining, based on detecting the plurality of vehicles in an image of a parking lot, the additional location information.

11. A method comprising:
determining, by a global positioning system (GPS) sensor of a mobile device, a location of the mobile device;
determining, by the mobile device and based on the location, vehicle identification information for a vehicle;
sending, by a mobile device and to a server, the vehicle identification information;
receiving, by the mobile device, from the server, and based on the vehicle identification information, a prompt to confirm an identity of the vehicle from one or more possible vehicles;
sending, by the mobile device and to the server, a response to the prompt;
receiving, by the mobile device, from the server, and based on the prompt, a listing comprising one or more additional vehicles, wherein the listing comprises one or more attributes for each of the one or more additional vehicles, wherein the one or more attributes comprise one or more vehicle features;
receiving, by the mobile device, a selection of an attribute of the one or more attributes;
sending, by the mobile device and to the server, the selection;
receiving, by the mobile device, from the server, and based on the selection, information indicating a path from a location of the mobile device to a location of the one or more additional vehicles;
determining, by the mobile device and based on the information indicating the path, one or more directions from the mobile device to the one or more additional vehicles;
determining, by the mobile device, and based on determining a relative orientation of the mobile device and the one or more additional vehicles, one or more direction indicators corresponding to the one or more directions; and
displaying, by the mobile device and based on the relative orientation, the one or more direction indicators.

12. The method of claim 11, wherein the location of the mobile device is determined based on an image.

13. The method of claim 11, wherein the one or more direction indicators comprise a plurality of direction indicators each relative to one of a plurality of vehicles of the one or more additional vehicles.

14. The method of claim 11, wherein the one or more direction indicators comprises a directional symbol indicating a relative position of one of the one or more additional vehicles based on the relative orientation of the mobile device.

15. The method of claim 11, wherein the relative orientation is based on feedback from a solid-state gyroscope.

16. An apparatus comprising:
a location sensor;
a wireless transceiver;
an orientation sensor;
a display screen;
one or more processors; and
memory storing instructions that, when executed by the one or more processors, cause the apparatus to:

determine, using the location sensor, a location of a apparatus;

receive, using the wireless transceiver, from a server, and based on the location, one or more possible vehicles that correspond to an identity of a vehicle;

prompting, using the display screen, a user to identify the vehicle from the one or more possible vehicles;

send, using the wireless transceiver, a user response to the prompt;

receive, using the wireless transceiver, from the server, and based on the user response, a listing comprising one or more additional vehicles other than the vehicle, wherein the listing comprises one or more attributes for each of the one or more additional vehicles;

receive, using the wireless transceiver, a selection of an attribute for comparison from the one or more attributes;

send, using the wireless transceiver and to the server, the selection;

receive, using the wireless transceiver, from the server, and based on the selection, information indicating a path from the location of the apparatus to a location of the one or more additional vehicles;

determine, based on the information indicating the path, one or more directions from the apparatus to the one or more additional vehicles;

determine, based on determining a relative orientation of the apparatus and the one or more additional vehicles, one or more direction indicators corresponding to the one or more directions; and output, for display on the display screen and based on the relative orientation, the one or more direction indicators overlaid on a video of an environment of the apparatus.

17. The apparatus of claim 16, wherein the location sensor comprises a global positioning system (GPS) sensor.

18. The apparatus of claim 16, wherein the one or more direction indicators comprise a plurality of direction indicators each relative to one of a plurality of vehicles of the one or more additional vehicles.

19. The apparatus of claim 16, wherein the one or more direction indicators comprises a directional symbol indicating a relative position of one of the one or more additional vehicles based on the relative orientation.

20. The apparatus of claim 16, wherein the relative orientation is based on feedback from a solid-state gyroscope.

* * * * *